Aug. 28, 1928.

T. N. JOYCE 1,682,229

ADJUSTABLE WINDSHIELD

Filed Dec. 10, 1926

INVENTOR
TEMPLE N. JOYCE.
BY
ATTORNEY

Patented Aug. 28, 1928.

1,682,229

UNITED STATES PATENT OFFICE.

TEMPLE N. JOYCE, OF ARNOLD, MARYLAND, ASSIGNOR TO CURTISS AEROPLANE & MOTOR COMPANY, INC., A CORPORATION OF NEW YORK.

ADJUSTABLE WINDSHIELD.

Application filed December 10, 1926. Serial No. 153,845.

My invention relates to wind shields for aircraft.

An object of the invention is to provide a wind shield which is adjustable relatively to the aeroplane fuselage or body, and which, thru its adjustment or sliding movement, is adapted to vary the size of the cockpit opening in the vicinity of which it (the wind shield) is disposed.

A further object of the invention is to provide a sliding wind shield which is releasably held against backward sliding movement by suitable mechanical means, and which, in a forward direction, is freely movable at all times, whereby, should the pilot for any cause be thrown forward against the wind shield, it (the wind shield) will move with and under the impact of the blow, thus preventing injury to the pilot.

A still further object of the invention is to provide an adjustable wind shield which is guided in its sliding movement by suitable rails; which is mounted to slide on suitable anti-friction devices; which is automatically mechanically fastened against backward movement in any position of adjustment desired; and which. to a very considerable extent is frictionally held against forward sliding movement by the air force acting on its surface.

Other objects and advantages of the invention will be hereinafter set forth.

In the drawings, wherein like reference characters denote like or corresponding parts.

Figure 1:
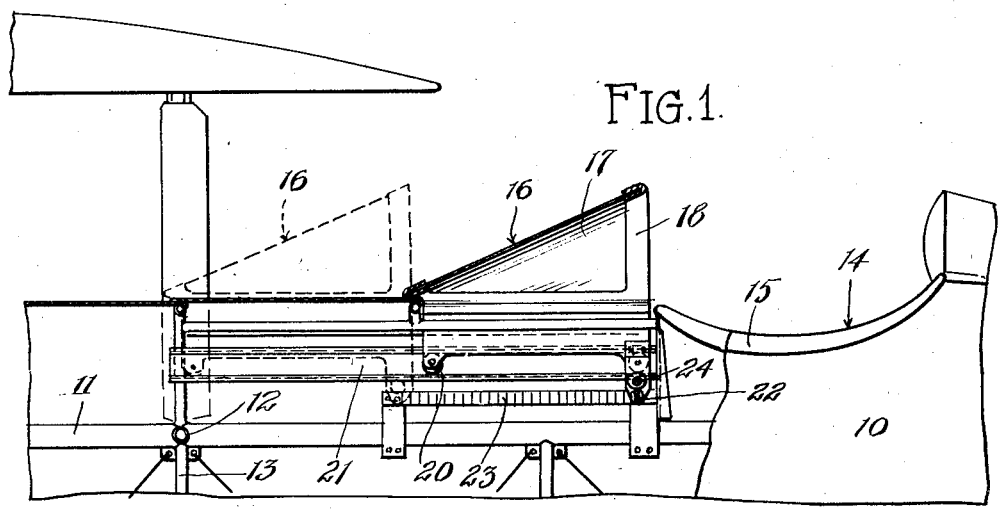
Fig. 1 is a longitudinal vertical sectional view of that part or portion of an aeroplane fuselage in the vicinity of one of the cockpits thereof showing the relation of the adjustable wind shield thereto; the dotted lines indicating the position of the wind shield in its forward position of adjustment.

In the embodiment of the invention selected for illustration an aeroplane fuselage or body 10 is shown. Such fuselage or body 10 comprises the usual longerons 11, horizontal fuselage struts 12, and vertical fuselage struts 13. Any suitable character of covering such as fabric, veneer or sheet metal, may be provided to enclose the fuselage frame. Intermediately of its ends, the fuselage 10 has formed therein a cockpit 14 edged as shown by suitable coaming 15.

Figure 2:
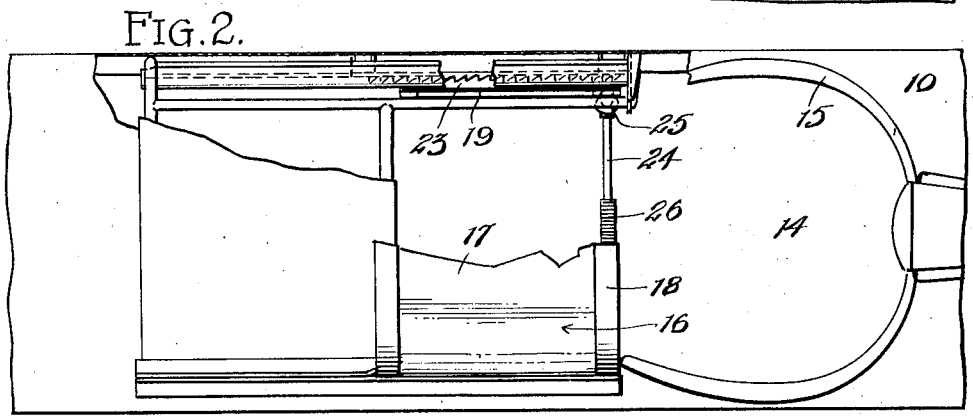
Fig. 2 is a plan view, partly broken away, of the structure illustrated in Fig. 1.
Figure 3:
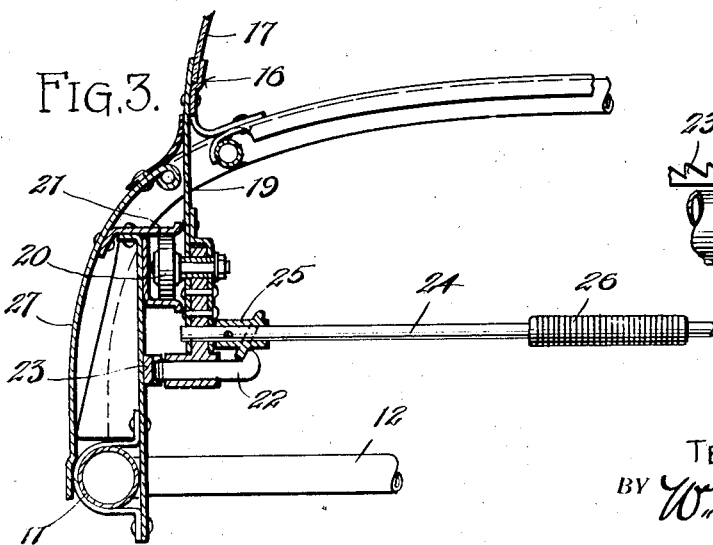
Fig. 3 is an enlarged transverse vertical sectional view of a portion of the wind shield showing the manner in which it is slidably held and releasably fastened in place.

That the desired streamline of the fuselage 10 may be carried out to the best advantage, the cockpit opening is made smaller in area than is usually the case. To admit, however, of easy ingress and egress to and from said cockpit, said opening, which is forwardly extended beyond the coaming as indicated in Fig. 2, may be varied in size thru the use of an adjustable wind shield designated in its entirety as 16. The size of the wind shield is preferably such that the forwardly extended portion of the cockpit opening is completely covered by said wind shield when it (the wind shield) occupies the position indicated in Fig. 2.

The wind shield 16 in transverse section is of more or less conventional form. It comprises a suitably shaped transparency 17 mounted in a frame 18 so shaped in elevation and in plan as to merge substantially uninterruptedly into the exterior lines of both the fuselage covering and the coaming 15 of the cockpit. Normally said wind shield 16 is adapted to occupy the full line position indicated in Fig. 1. Thus positioned the size of the cockpit opening is appreciably reduced. For the purpose of enlarging said opening, however, the position of the wind shield may be varied as shown, i. e., slid forwardly until it occupies the dotted line position indicated in said Fig. 1. In said latter position the size of the cockpit opening is greatly increased. Accordingly the occupant of the cockpit may climb either in or out with comparative ease.

Along its opposite sides or edges the wind shield frame 18 has formed thereon or attached thereto suitable depending portions or aprons 19, having mounted thereon two or more anti-friction rollers 20 which are adapted to engage in channel shaped rails 21 provided, one each, at opposite sides of the cockpit. These channel shaped rails 21 are directly supported by the longerons 11 of the fuselage frame. Preferably said rails extend longitudinally of the fuselage from a point at or near the open end of the cockpit enlargement to a point well forward thereof; the function of the rails being that of guides along which the wind shield 16 is free to slide.

Figure 4:
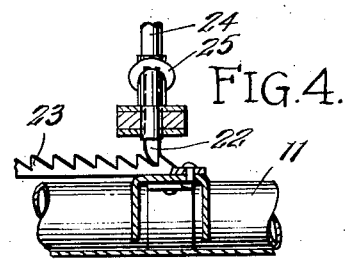
Fig. 4 is a fragmentary sectional view showing a detail of construction.

In addition to the anti-friction rollers 20 at opposite sides of the wind shield, latch bars 22 are provided. Said latch bars each engage in a toothed rack 23 mounted on the inside of the supports for the guide rails 21. The function of the latch bars 22 is to hold the wind shield against accidental backward movement and yet permit, should occasion demand, its free forward sliding movement under impact. The latch bar construction and the shape of the racket teeth (see Fig. 4) contribute to this function.

A wind shield characterized as above set forth is freely movable at all times in a forward direction, the only resistance to such movement being that offered by the frictional contact between the outer latch bar ends and the beveled faces of the rack bar teeth with which the latch bars engage. This same construction and this same engagement between the rack bars and the latch bars prevents all casual movement of the wind shield in a backward or reverse direction. To secure the backward adjustment of the wind shield it is necessary that the latch bars 22 be mechanically withdrawn out of engagement with the rack bar teeth. This is accomplished by means of a cross-rod 24 extending from one to the other side of the wind shield and having mounted upon its opposite ends suitable cams 25 which are adapted to engage, one each, with the latch bars 22. By rotating this rod 24 by means of a conveniently located grip 26, said cams 25 are made to simultaneously disengage the latch bars, such disengagement permitting the unobstructed backward movement of the wind shield. To fair in the wind shield, suitable fairing pieces 27 may be provided along its opposite sides.

While I have described my invention in detail in its present preferred embodiment, it will be obvious to those skiled in the art after understanding my invention, that various changes and modifications may be made therein without departing from the spirit or scope thereof. I aim in the appended claims to cover all such modifications and changes.

What I claim is:

1. The combination, in an aeroplane, of a fuselage having formed therein a cockpit opening, an adjustable wind shield slidable lengthwise the fuselage to cover and uncover a substantial portion of said opening, said wind shield, in its forward position of adjustment, being adapted to occupy a position forward of said opening, and means operable to lock said wind shield, in any position of adjustment, against sliding movement in one direction only.

2. The combination, in an aeroplane, of a fuselage having formed therein a cockpit opening, an adjustable wind shield slidable lengthwise the fuselage to cover and uncover a substantial portion of said opening, rails carried inside the fuselage to guide said wind shield in its sliding movement, and means operable to lock said wind shield in any position of adjustment, against sliding movement in one direction only.

3. The combination, in an aeroplane, of a fuselage having formed therein a cockpit opening, a wind shield freely slidable in one direction lengthwise said fuselage to uncover a substantial portion of said opening, said wind shield in its forward positon of adjustment beng adapted to occupy a position forward of said opening, and means operable to lock said wind shield in any position of adjustment against sliding movement in a reverse direction.

4. The combination, in an aeroplane, of a fuselage having formed therein a cockpit opening, a wind shield freely slidable in one direction, lengthwise the fuselage, to uncover a substantial portion of said opening, said wind shield in its forward position of adjustment being adapted to occupy a position forward of said opening, rails carried inside the fuselage to guide said wind shield in its sliding movement, and means operable to lock said wind shield, in any position of adjustment, against sliding movement in a reverse direction.

5. The combination, in an aeroplane, of a fuselage having formed therein a cockpit opening, an adjustable wind shield slidable lengthwise the fuselage to cover and uncover a substantial portion of said opening, rails carried inside the fuselage to guide said wind shield in its sliding movement, a rack bar likewise mounted inside the fuselage, means movable with the wind shield and engaging said rack bar to lock said wind shield against sliding movement, and means likewise movable with said wind shield to release said locking means.

6. The combination, in an aeroplane, of a fuselage having formed therein a cockpit opening, a sliding wind shield movable lengthwise the fuselage to cover and uncover a substantial portion of said opening, said wind shield, under impact, being freely movable in a forward direction, means for guiding said wind shield in its sliding movement, means for locking said wind shield against sliding movement in a reverse direction, and a release means for said locking means.

In testimony whereof I hereunto affix my signature.

TEMPLE N. JOYCE.